July 1, 1947.  T. H. LONG  2,423,194
APPARATUS FOR MEASURING THE DWELL AND FREQUENCY OF ELECTRICAL IMPULSES
Filed April 16, 1943
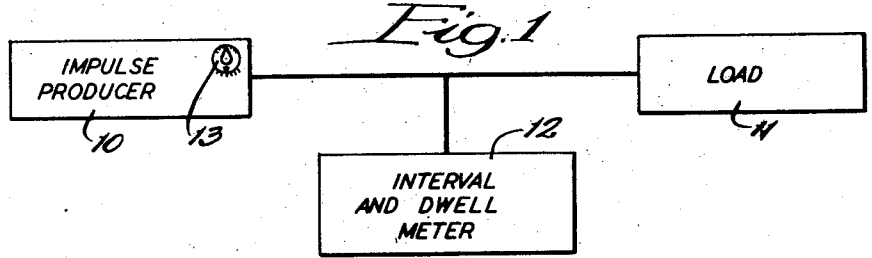
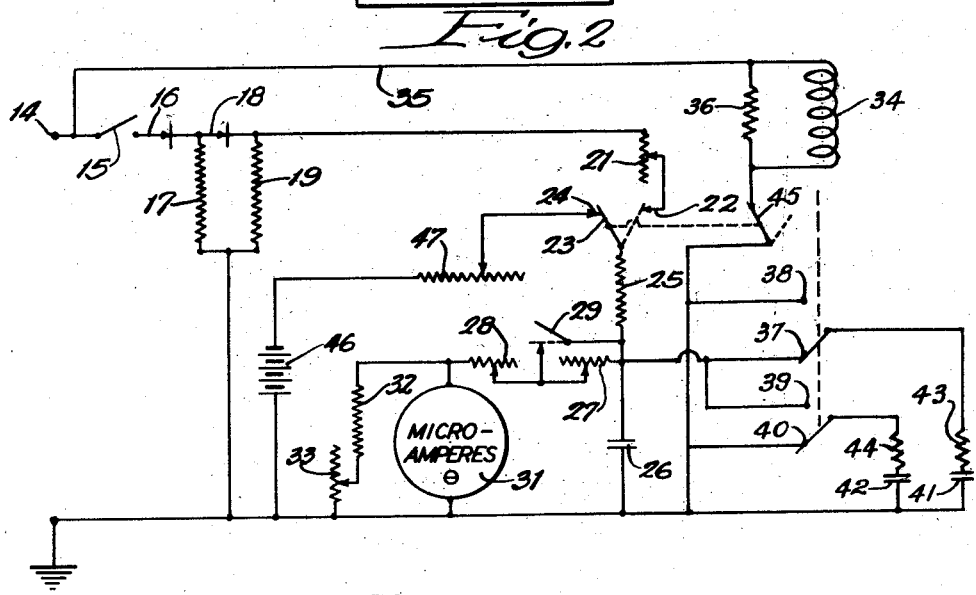
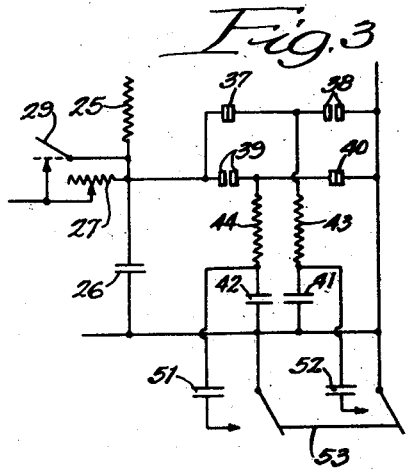
Inventor:
Thomas H. Long,
By Dawson, Ooms and Bortz
Attorneys.

Patented July 1, 1947

2,423,194

UNITED STATES PATENT OFFICE 2,423,194

APPARATUS FOR MEASURING THE DWELL AND FREQUENCY OF ELECTRICAL IMPULSES

Thomas H. Long, Elkhart, Ind., assignor to C. G. Conn, Ltd., Elkhart, Ind., a corporation of Indiana Application April 16, 1943, Serial No. 483,236

12 Claims. (Cl. 171—95)

This invention relates to apparatus for measuring impulses and more particularly to the measurement of the dwell and frequency or interval of electrical impulses.

While the invention is capable of use in connection with many types of apparatus for producing electrical impulses, it is described herein in connection with a bomb release interval control in military aviation. In a construction of this type, an interval control is provided to produce electrical impulses which operate to release bombs successively through solenoids or similar apparatus. Ordinarily, such controls are adjustable to enable them to produce impulses at a rate between one impulse per second and twenty impulses per second. Normally the minimum time duration of the impulse and the minimum interval between successive impulses must be at least .023 second and the ratio between time on and time off or vice versa may not exceed three-to-one. In such devices the ratio of time-on to total elapsed time, is termed the dwell.

In calibrating interval controls of this type it has heretofore been customary to determine the frequency or interval of the impulses and the dwell by oscillographic devices in the use of which a great deal of time is consumed in measuring the oscillographic film and calculating the dwell and interval from such measurements. It has also been attempted to calibrate devices of this type through a counter and stop watch but this will indicate only the average frequency without giving any indication whatever of the dwell.

One of the objects of the present invention is to provide apparatus for measuring impulses which will give a direct indication of the frequency of impulse and of the percentage of time the impulse lasts. From this information the ratio of time on to time off and the interval between impulses can readily be determined.

Another object of the invention is to provide apparatus for measuring impulses in which the interval and dwell are indicated successively on a single meter. According to one feature of the invention, the meter may be calibrated to read directly in percent of dwell and in the ground distance between bomb hits at a given ground speed.

Still another object of the invention is to provide apparatus for measuring impulses in which the sensitivity can be adjusted without changing the characteristics of the system or the scale distribution of its indicating meter.

A further object of the invention is to provide apparatus for measuring impulses in which the dwell is measured by producing a current proportional to the average duration of the impulses over several cycles and measuring a function of such current.

Still another further object of the invention is to provide apparatus for measuring impulses in which the interval between impulses is measured by producing a current proportional to a function of the average impulse frequency over several cycles and measuring a function of the current.

The above and other objects and advantages of the invention will be more readily apparent from the following description when read in connection with the accompanying drawing, in which—

Figure 1 is a block diagram of a system embodying the invention;

Figure 2 is a circuit diagram of the impulse and dwell meter of Figure 1; and

Figure 3 is a partial circuit diagram similar to Figure 2 illustrating a modification.

In Figure 1 an impulse producer 10 which may be an interval control of the type referred to above is connected to a load indicated at 11 which may be solenoids or the like for controlling release of bombs. The meter of the present invention is indicated generally at 12 and is connected in the circuit between the impulse producer and the load to indicate the dwell and interval of the impulses generated in the impulse producer. The impulse producer is provided with an adjusting dial shown at 13 which is normally calibrated in feet of interval between bomb hits on the ground. In order to accommodate such a dial to various ground speeds, it is necessary that a scale be employed which is calibrated logarithmically and which may be moved over a second scale calibrated logarithmically in terms of ground speed. It is desirable therefore that the interval meter used in calibrating the control be itself calibrated in terms of feet of interval for a given ground speed and that its scale distribution be logarithmic.

In the circuit shown in Figure 2 the contact 14 is connected to the output of the impulse producer so that it will be energized by the impulses to be measured. During calibration with the meter of the present invention a solenoid load may be connected between the contact 14 and ground. The contact is connected through a switch 15 to a rectifier 16, having a resistance load 17, in series with a second rectifier 18 having a resistance load 19. The rectifiers are necessary since the load is ordinarily inductive and at the end of each impulse will reverse the voltage at the terminal 14. Since the instrument when used for measuring dwell is responsive to the average voltage appearing at the terminal 14, these voltage reversals due to the load would produce a variable effect at the contact 14 which is eliminated by the rectifiers. Preferably at least two rectifiers are used in series to reduce the percentage of the reverse voltage which will be passed without materially snubbing the action of the inductive load.

The output of the last rectifier is connected to a variable resistance 21 which terminates in a switch contact 22. A switch blade 23 is adapted to engage either the contact 22 or an opposed contact 24 and the blade is connected through a resistance 25 to a condenser 26.

A shunt circuit is connected across the condenser 26 and includes a variable resistance 27 and a second variable resistance 28 in series. A switch 29 is provided to shunt the resistance 27 when desired. A microammeter 31 is connected in series with the resistances 27 and 28 and has in shunt with it a fixed resistance 32 and a variable resistance 33 for calibrating the circuit as will be explained hereinafter and to damp oscillations of the pointer.

For indicating dwell the switch 15 is closed, switch blade 23 engages contact 22 and switch 29 is closed. A switch 45 to be described hereinafter in connection with interval measurements is open. Under these conditions a voltage will be impressed on the resistances 21, 25, 28, 32 and 33 in series with the condenser 26 in parallel with resistors 28, 32 and 33. This circuit damps out the pulses so that a voltage will appear across condenser 26 which is substantially constant for any given dwell and is proportional to the voltage across the resistance 19 as averaged over several cycles. The voltage across the condenser will be indicated by the meter 31 which will accordingly give a direct indication of the percentage of dwell.

In calibrating the system to indicate the dwell the meter 31 may be set at zero with the switch 15 open or with no voltage applied at the terminal 14 and may be set at full scale with the switch 15 closed and a steady voltage equal to maximum impulse voltage applied at the terminal 14. This can be accomplished by adjusting the resistance 21, the switch 29 being closed during dwell calibration and indication. The percentage of dwell during operation will then be indicated directly by the meter which may be provided with uniformly calibrated dwell scale.

For indicating the interval between successive impulses or the frequency of the impulses, current impulses applied at the terminal 14 operate a relay which varies the voltage across the condenser 26 in accordance with the frequency of the impulses. For their purpose a relay coil 34 is connected by a wire 35 to the contact 14, a resistance 36 being shunted across the coil to slow down the armature release travel of the relay. The coil 34 controls four sets of contacts 37, 39, 39 and 40 which are alternately opened and closed in pairs alternately to charge and discharge a pair of condensers 41 and 42. As shown, the condenser 41 is connected through a resistance 43 to a common lead between contacts of the sets 37 and 38 and the condenser 42 is connected through a resistance 44 to a common lead between contacts of the sets 39 and 40. The resistances 43 and 44 are used only to prevent welding of the relay contacts and are preferably of the order of about 100 ohms each. The other contacts of switches 37 and 39 are connected to one side of the condenser 26 while the remaining contacts of switches 38 and 40 are connected to ground as shown. The relay coil 34 may be connected in the circuit by a switch 45 which is coupled to the switch blade 23 to be operated therewith.

During interval measurement the switch 15 is open, switch blade 23 engages contact 24, switch 29 is open and switch 45 is closed. The condenser 26 is charged with a unidirectional voltage supplied by a battery 46 which is connected through a variable resistance 47 to the switch contact 24. When this switch is closed the battery will impress a constant voltage on the circuit.

At this time the condenser 26 will be charged from the battery and the relay 34 will be operated at a frequency proportional to the frequency of the impulses. It will be noted that in operation of this relay 34 it will move to one position at the beginning of each impulse to close one pair of contacts, for example 37 and 40, to charge the condenser 41 and discharge the condenser 42 and will move to its other position at the end of each impulse to close the contacts 38 and 39 to charge the condenser 42 and discharge the condenser 41. These condensers will be charged from the condenser 26 and are preferably small in comparison to the condenser 26 so that cyclic fluctuations of the voltage across the condenser 26 will be small. Condensers 41 and 42 charge from the condenser 26 rather than from the battery 46 because of the time constants involved. If the resistance 43 and 44 are equal and equal 150,000 ohms, condenser 26 equals 30 mfd., and condensers 41 and 42 equal 4 mfd., the time constant for charging condenser 26 and condenser 41 in parallel will be $$32 \times 10^{-6} \times 75{,}000 = 2.4 \text{ sec.}$$

The time constant for charging condenser 41 from condenser 26 will be $2 \times 10^{-6} \times 400 = .0008$ sec. When one impulse per second is applied, condenser 41 will be charged to 20 volts in the first .001 second, taking virtually all of its charge from condenser 26. In the next .499 second condensers 26 and 41 in parallel will charge to about 20.7 volts. Thus substantially all of the charge on condensers 41 and 42 is supplied from the condenser 26. Each operation and each release of the relay takes from the condenser 26 a quantity of electricity proportional to the voltage across the condenser 26 and independent of the length of time the relay contacts are closed, so long as they are closed for a period several times the time constant of one of the resistance and condenser combinations 44 and 42 or 43 and 41. Ordinarily this time constant will be quite small, less than .001 second. It is obvious that the more rapidly the impulses occur the more rapidly current will be conducted away from the condenser 26 so that deflection of the meter 31 will be varied approximately inversely with the frequency of contact.

Distribution of the meter scale for interval indication may be controlled by properly proportioning the various circuit constants in order to obtain the desired logarithmic distribution. Assuming that the voltage across the condenser 26 does not vary cyclically as the impulses proceed, which is substantially correct if a sufficiently large condenser is employed, the relationship of the several constants in the circuit may be expressed mathematically as follows:

(1) $$i_3 = fCe = \frac{146.7}{s} Ce$$

(2) $$e = E - R_1 i_1 = E - R_1\left(i_3 + \frac{e}{R_2}\right) = E - R_1\left(\frac{146.7}{s} Ce + \frac{e}{R_2}\right)$$

(3) $$\frac{E}{e} = 1 + R_1\left(\frac{146.7}{S} C + \frac{1}{R_2}\right) = 1 + R_1\left(\frac{146.7 CR_2 + S}{SR_2}\right)$$

(4) $$\frac{e}{E} = \frac{SR_2}{SR_2 + R_1(146.7 CR_2 + S)} = \frac{R_2}{R_1 + R_2 + \frac{146.7 CR_1 R_2}{S}}$$

Note that for any particular value of $R_2$, $e$ is proportional to meter deflection. Let $e'$—value of $e$ for $S=S'$; then (5) $$\frac{e}{e'} = \frac{R_1 + R_2 + \frac{146.7 CR_1 R_2}{S'}}{R_1 + R_2 + \frac{146.7 CR_1 R_2}{S}}$$

Where
$f$=Contacts/sec. of any one contact
$S$=Interval in ft. @ 100 M. P. H. ground speed= $\frac{146.7}{F}$ $C$=Capacity of condensers 41+42 in farads
$R_1$=Resistance of resistors 47+25
$R_2$=Resistance of resistor 28+meter 31 and shunt 32 and 33
$E$=E. M. F. of battery 46
$e$=Voltage across condenser 26
$i_1$=Ave. current through $R_1$
$i_2$=Ave. current through $R_2$
$i_3$=Ave. current drawn from condenser 26 by condensers 42 and 43.

It will be noted from this analysis that for the most efficient use of condenser capacity the resistance designated as $R_1$ should approximately equal the resistance designated as $R_2$, since $R_1$ plus $R_2$ is limited by meter sensitivity and applied voltage; and for the most desirable scale distribution the sum of $R_1$ and $R_2$ should equal approximately ¾ of the other factor in the denominator of Equation 4 when S corresponds to mid-scale deflection.

It will also be noted that the interval meter can be made independent of variations in battery voltage occurring in use due to temperature changes, aging of the battery and the like through the use of the variable resistance 33. Ordinarily the resistance 28 will be on the order of 150,000 ohms, resistances 47 and 25 together will be of the same order, the internal resistance of the meter 31 will be of the order of 2,000 ohms and the sum of the resistances 32 and 33 will be of the same order. Thus a change of 10 percent in the resistance shunted across the meter will make a negligible change in the total resistance designated $R_1$ so that the scale distribution will not be materially affected but the sensitivity of the meter will be substantially adjusted. Thus a change in battery voltage can be compensated by adjustment of this shunt resistance to calibrate the meter.

In actually calibrating the meter for interval indication the switch 29 is opened to insert the resistance 27 in the shunt circuit in series with resistance 28. With no impulses present at the terminal 14 the meter may be adjusted for any predetermined reading, normally full scale, by adjusting the resistance 33. The switch 29 may then be closed to cut out the resistance 27 and the meter will indicate directly in feet the ground interval corresponding to the frequency of applied impulses. Resistance 27 is shorted by switch 29 after calibration to make any desired minimum impulse frequency correspond to full scale deflection.

Temperature error in the system may be eliminated by providing resistances 47, 25, 27 and 28 of material having a substantially zero temperature coefficient and by matching the temperature coefficient of the resistances 32 and 33 with the temperature coefficient of the meter winding. The temperature coefficient of the resistance 21 is relatively unimportant since this resistance normally requires resetting each time the impulse voltage is changed and is provided to compensate for variations in impulse voltage.

Figure 3 illustrates a modification of the circuit of Figure 2 to change the sensitivity without affecting scale distribution. As shown in Figure 3, condensers 51 and 52 may be connected in parallel with the condensers 41 and 42 by a switch 53. With these additional condensers 51 and 52 connected in the circuit the capacity C will be changed to vary the sensitivity of the meter. The same effect could be obtained by varying certain of the resistances in the circuit but this would require simultaneous adjustment of the resistances 47, 27, and 28 which would be somewhat more complicated and variation of the condensers is therefore preferred.

While one embodiment of the invention is shown and described in detail herein, it will be understood that this is illustrative only and is not intended as a definition of the scope of the invention, reference being had for this purpose to the appended claims.

What is claimed is:

1. In apparatus for measuring impulses, a rectifier connected to a source providing the impulses, a resistance and a condenser connected in series to receive the rectified impulses, a shunt circuit across the condenser, and means to measure a function of the average current in the shunt circuit.

2. In apparatus for measuring impulses, a rectifier connected to a source providing the impulses, a resistance and a condenser connected in series to receive the rectified impulses, a resistance in shunt across the condenser, and means to measure a function of the average current in the last named resistance.

3. In apparatus for measuring impulses, a rectifier connected to a source providing the impulses, a resistance loading the rectifier, a circuit connected across the resistance, a resistance and condenser in series in the circuit, a resistance in shunt with the condenser, and means for measuring a function of the voltage across the condenser.

4. In apparatus for measuring impulses including a source of unidirectional voltage, a resistance and condenser in series with the source of voltage, a shunt circuit including a resistance across the condenser, the shunt circuit resistance being not less than half nor more than twice the series resistance, and means for measuring a function of the current in the shunt circuit.

5. In apparatus for measuring the dwell of a series of impulses, a rectifier connected to a source providing the impulses, a resistance load connected with the rectifier to receive rectified impulses therefrom, a circuit connected across the resistance load, including a resistance and condenser in series, voltage responsive indicating means connected across the condenser, and resistance shunting means across the indicating means to damp the pointer oscillations of the indicating means.

6. In apparatus for measuring impluses, a condenser, a source of undirectional voltage in series with the condenser to charge it, means connected to the condenser and responsive to impulses to be measured to reduce the voltage across the condenser an amount proportionally increasing with the frequency of the impulses, and voltage indicating means connected across the condenser.

7. In apparatus for measuring impulses, a condenser, a source of unidirectional voltage in series with the condenser to charge it, means connected to the condenser and responsive to impulses to reduce the voltage across the condenser an amount increasing with the frequency of the impulses, voltage indicating means connected across the condenser, and means connected to the voltage indicating means to damp its response to cyclic variations.

8. In apparatus for measuring impulses, a condenser, a source of unidirectional voltage in series with the condenser to charge it, voltage indicating means connected across the condenser, a second condenser, and means responsive to impulses to be measured alternately to connect the second condenser to the first condenser and to ground.

9. Impulse measuring means including a source of unidirectional voltage, a resistance $R_1$ and a condenser in series with said source, voltage responsive means connected across said condenser introducing a shunt across said condenser of $R_2$ ohms, means for alternately connecting and discharging at least one condenser of $C$ farads total capacity across said first-named condenser, said voltage responsive means having a mid-scale reading corresponding to an impulse frequency $f$ in cycles per sec. and in which $R_1$, $R_2$, $C$ and $f$ are related by the limiting conditions $$1.1(R_1+R_2)<fCR_1R_2<2(R_1+R_2)$$

10. In apparatus for measuring impulses a circuit including a condenser, voltage indicating means connected across the condenser, rectifying means connected to the source of impulses, a source of unidirectional voltage, a switch to connect the circuit to either the rectifying means or to the source of voltage, a second condenser, relay means alternately to connect the second condenser across the first-named condenser or to ground, and a switch operable simultaneously with the first-named switch to connect the relay means in circuit with the source of impulses.

11. In apparatus for measuring impulses, an electrical meter, circuit means connected to the source of the impulses for producing a current whose value is proportional to the ratio between the duration of the impulses and total elapsed time, means connecting the meter to said circuit means, a second circuit means for producing a current that is a function of the frequency of the impulses, and means for connecting the second circuit means to the meter.

12. In apparatus for measuring impulses, a circuit including a condenser, a second condenser responsive to the impulses and connected to the first condenser to set up in the circuit a series of electrical transients having a frequency proportional to the frequency of the impulses, a meter connected to the circuit to indicate a function of the current produced by the impulses, and means for changing the effective capacity of the first condenser to change the effective range of the meter without changing the characteristics of the apparatus.

THOMAS H. LONG.

REFERENCES CITED

The following references are of record in the file of this patent:

UNITED STATES PATENTS

| Number | Name | Date |
|---|---|---|
| 2,012,837 | Tear | Aug. 27, 1935 |
| 1,916,764 | Laurenson | July 4, 1933 |
| 2,114,016 | Dimond | Apr. 12, 1938 |
| 2,162,239 | Beuermann | June 13, 1939 |
| 2,176,742 | Pierre | Oct. 17, 1939 |
| 2,217,477 | Gulliksen | Oct. 8, 1940 |
| 2,218,642 | Hathaway | Oct. 22, 1940 |
| 2,228,883 | Morgan | Jan. 14, 1941 |
| 2,285,482 | Wunsch | June 9, 1942 |
| 2,250,708 | Herz | July 29, 1941 |
| 1,577,046 | Miller | Mar. 16, 1926 |
| 1,933,274 | Ludwig | Oct. 31, 1933 |
| 2,216,730 | Berger | Oct. 8, 1940 |
| 1,526,337 | Hartley | Feb. 17, 1925 |
| 2,137,859 | Schwartz et al. | Nov. 22, 1938 |
| 2,177,569 | Jorgensen et al. | Oct. 24, 1939 |
| 2,184,877 | Shields | Dec. 26, 1939 |
| 2,243,725 | Allison | May 27, 1941 |
| 1,830,170 | Lindenblad | Nov. 3, 1931 |

OTHER REFERENCES

"Electronics," April 1942, pages 34–36, 177–311.11.

"Electrical Measurements" by Laws, page 53, 1st edition, 1917. (Copy in Div. 48.)